US007970613B2

(12) United States Patent
Chen

(10) Patent No.: US 7,970,613 B2
(45) Date of Patent: Jun. 28, 2011

(54) METHOD AND SYSTEM FOR GAUSSIAN PROBABILITY DATA BIT REDUCTION AND COMPUTATION

(75) Inventor: Ruxin Chen, Redwood City, CA (US)

(73) Assignee: Sony Computer Entertainment Inc., Tokyo (JP)

(*) Notice: Subject to any disclaimer, the term of this patent is extended or adjusted under 35 U.S.C. 154(b) by 1131 days.

(21) Appl. No.: 11/273,223

(22) Filed: Nov. 12, 2005

(65) Prior Publication Data

US 2007/0112566 A1 May 17, 2007

(51) Int. Cl.
*G10L 15/00* (2006.01)
(52) U.S. Cl. .............. 704/256; 704/240; 704/255
(58) Field of Classification Search .......... 704/240, 704/245, 254
See application file for complete search history.

(56) References Cited

U.S. PATENT DOCUMENTS

| 4,956,865 A | 9/1990 | Lennig et al. | 704/241 |
|---|---|---|---|
| 4,977,598 A | 12/1990 | Doddington et al. | 704/255 |
| RE33,597 E | 5/1991 | Levinson et al. | 704/256 |
| 5,031,217 A | 7/1991 | Nishimura | 704/256.4 |
| 5,050,215 A | 9/1991 | Nishimura | 704/256.4 |
| 5,129,002 A | 7/1992 | Tsuboka | 704/246 |
| 5,148,489 A | 9/1992 | Erell et al. | 704/226 |
| 5,222,190 A | 6/1993 | Pawate et al. | 704/200 |
| 5,228,087 A | 7/1993 | Bickerton | 704/232 |
| 5,345,536 A | 9/1994 | Hoshimi et al. | 704/243 |
| 5,353,377 A | 10/1994 | Kuroda et al. | 704/256.1 |
| 5,438,630 A | 8/1995 | Chen et al. | 382/159 |
| 5,455,888 A | 10/1995 | Iyengar et al. | 704/203 |
| 5,459,798 A | 10/1995 | Bailey et al. | 382/218 |
| 5,473,728 A | 12/1995 | Luginbuhl et al. | 704/243 |
| 5,502,790 A | 3/1996 | Yi | 704/256 |
| 5,506,933 A | 4/1996 | Nitta | 704/256 |
| 5,509,104 A | 4/1996 | Lee et al. | 704/256 |
| 5,535,305 A * | 7/1996 | Acero et al. | 704/256 |
| 5,581,655 A | 12/1996 | Cohen et al. | 704/245 |

(Continued)

FOREIGN PATENT DOCUMENTS

EP 0866442 9/1998

(Continued)

OTHER PUBLICATIONS

Vasilache, "Speech recognition Using HMMs With Quantized Parameters", Oct. 2000, 6th International Conference on Spoken Language Processing (ICSLP 2000), pp. 1-4.*

(Continued)

*Primary Examiner* — Richmond Dorvil
*Assistant Examiner* — Olujimi A. Adesanya
(74) *Attorney, Agent, or Firm* — Joshua D. Isenberg; JDI Patent

(57) ABSTRACT

Use of runtime memory may be reduced in a data processing algorithm that uses one or more probability distribution functions. Each probability distribution function may be characterized by one or more uncompressed mean values and one or more variance values. The uncompressed mean and variance values may be represented by $\alpha$-bit floating point numbers, where $\alpha$ is an integer greater than 1. The probability distribution functions are converted to compressed probability functions having compressed mean and/or variance values represented as $\beta$-bit integers, where $\beta$ is less than $\alpha$, whereby the compressed mean and/or variance values occupy less memory space than the uncompressed mean and/or variance values. Portions of the data processing algorithm can be performed with the compressed mean and variance values.

34 Claims, 2 Drawing Sheets

U.S. PATENT DOCUMENTS

| | | | |
|---|---|---|---|
| 5,602,960 A | 2/1997 | Hon et al. | 704/207 |
| 5,608,840 A | 3/1997 | Tsuboka | 704/236 |
| 5,615,296 A | 3/1997 | Stanford et al. | 704/270.1 |
| 5,617,486 A | 4/1997 | Chow et al. | 382/181 |
| 5,617,509 A | 4/1997 | Kushner et al. | 704/256 |
| 5,627,939 A | 5/1997 | Huang et al. | 704/256 |
| 5,649,056 A | 7/1997 | Nitta | 704/256 |
| 5,649,057 A | 7/1997 | Lee et al. | 704/256 |
| 5,655,057 A | 8/1997 | Takagi | 704/233 |
| 5,677,988 A | 10/1997 | Takami et al. | 704/256 |
| 5,680,506 A | 10/1997 | Kroon et al. | 704/203 |
| 5,680,510 A | 10/1997 | Hon et al. | 704/255 |
| 5,719,996 A | 2/1998 | Chang et al. | 704/256 |
| 5,745,600 A | 4/1998 | Chen et al. | 382/218 |
| 5,758,023 A | 5/1998 | Bordeaux | 704/232 |
| 5,787,396 A | 7/1998 | Komori et al. | 704/256 |
| 5,794,190 A | 8/1998 | Linggard et al. | 704/232 |
| 5,799,278 A | 8/1998 | Cobbett et al. | 704/256 |
| 5,812,974 A | 9/1998 | Hemphill et al. | 704/256.4 |
| 5,825,978 A | 10/1998 | Digalakis et al. | 704/256 |
| 5,860,062 A | 1/1999 | Taniguchi et al. | 704/256 |
| 5,880,788 A | 3/1999 | Bregler | 348/515 |
| 5,890,114 A | 3/1999 | Yi | 704/256 |
| 5,893,059 A | 4/1999 | Raman | 704/256.2 |
| 5,903,865 A | 5/1999 | Ishimitsu et al. | 704/256 |
| 5,907,825 A | 5/1999 | Tzirkel-Hancock | 704/243 |
| 5,930,753 A | 7/1999 | Potamianos et al. | 704/256.2 |
| 5,937,384 A | 8/1999 | Huang et al. | 704/256 |
| 5,943,647 A | 8/1999 | Ranta | 704/251 |
| 5,956,683 A | 9/1999 | Jacobs et al. | 704/270.1 |
| 5,963,903 A | 10/1999 | Hon et al. | 704/256 |
| 5,963,906 A | 10/1999 | Turin | 704/256 |
| 5,983,178 A | 11/1999 | Naito et al. | 704/245 |
| 5,983,180 A | 11/1999 | Robinson | 704/254 |
| 6,009,390 A | 12/1999 | Gupta et al. | 704/240 |
| 6,009,391 A | 12/1999 | Asghar et al. | 704/243 |
| 6,023,677 A | 2/2000 | Class et al. | 704/254 |
| 6,061,652 A | 5/2000 | Tsuboka et al. | 704/245 |
| 6,067,520 A | 5/2000 | Lee | 704/270 |
| 6,078,884 A | 6/2000 | Downey | 704/243 |
| 6,092,042 A | 7/2000 | Iso | 704/240 |
| 6,112,175 A | 8/2000 | Chengalvarayan | 704/256.5 |
| 6,138,095 A | 10/2000 | Gupta et al. | 704/234 |
| 6,138,097 A | 10/2000 | Lockwood et al. | 704/256.2 |
| 6,141,641 A * | 10/2000 | Hwang et al. | 704/243 |
| 6,148,284 A | 11/2000 | Saul | 704/256.4 |
| 6,151,573 A | 11/2000 | Gong | 704/256.2 |
| 6,151,574 A | 11/2000 | Lee et al. | 704/256 |
| 6,188,982 B1 | 2/2001 | Chiang | 704/256.5 |
| 6,223,159 B1 | 4/2001 | Ishii | 704/256.7 |
| 6,226,612 B1 | 5/2001 | Srenger et al. | 704/256.2 |
| 6,236,963 B1 | 5/2001 | Naito et al. | 704/241 |
| 6,246,980 B1 | 6/2001 | Glorion et al. | 704/231 |
| 6,253,180 B1 | 6/2001 | Iso | 704/244 |
| 6,256,607 B1 * | 7/2001 | Digalakis et al. | 704/222 |
| 6,292,776 B1 | 9/2001 | Chengalvarayan | 704/219 |
| 6,405,168 B1 | 6/2002 | Bayya et al. | 704/256 |
| 6,418,412 B1 * | 7/2002 | Asghar et al. | 704/256.5 |
| 6,629,073 B1 | 9/2003 | Hon et al. | 704/256.4 |
| 6,662,160 B1 | 12/2003 | Chien et al. | 704/256 |
| 6,671,666 B1 | 12/2003 | Ponting et al. | 704/233 |
| 6,671,668 B2 | 12/2003 | Harris | 704/246 |
| 6,671,669 B1 | 12/2003 | Garudadri et al. | 704/255 |
| 6,681,207 B2 | 1/2004 | Garudadri | 704/256 |
| 6,801,892 B2 | 10/2004 | Yamamoto | 704/256 |
| 6,832,190 B1 | 12/2004 | Junkawitsch et al. | 704/255 |
| 6,868,382 B2 | 3/2005 | Shozakai | 704/254 |
| 6,901,365 B2 | 5/2005 | Miyazawa | 704/256 |
| 6,907,398 B2 | 6/2005 | Hoege | 704/265 |
| 6,934,681 B1 | 8/2005 | Emori et al. | 704/250 |
| 6,980,952 B1 | 12/2005 | Gong | 704/234 |
| 7,003,460 B1 | 2/2006 | Bub et al. | 704/256 |
| 7,133,535 B2 | 11/2006 | Huang et al. | 382/100 |
| 7,139,707 B2 | 11/2006 | Sheikhzadeh-Nadjar et al. | 704/243 |
| 7,454,341 B1 * | 11/2008 | Pan et al. | 704/256 |
| 2004/0220804 A1 * | 11/2004 | Odell | 704/230 |
| 2005/0010408 A1 * | 1/2005 | Nakagawa et al. | 704/240 |

FOREIGN PATENT DOCUMENTS

| | | |
|---|---|---|
| JP | 09290617 | 11/1997 |
| JP | 2000338989 | 8/2000 |

OTHER PUBLICATIONS

Bocchieri, "Vector Quantization for the efficient Computation of Continuous Density Likelihoods", Apr. 1993, International conference on Acoustics, Speech, and signal Processing, IEEE, pp. 692-695.*

Rohit Sinha et al., "Non-Uniform Scaling Based Speaker Normalization" 2002 IEEE, May 13, 2002, vol. 4, pp. I-589-I-592.

Li Lee et al., "Speaker Normalization Using Efficient Frequency Warping Procedures" 1996 IEEE, vol. 1, pp. 353-356.

International application No. PCT/US2007/061707 (SCEA05047WO00), "The International Search Report" and "The written Option of the International Searching Authority".

Lawrence Rabiner, "A Tutorial on Hidden Markov Models and Selected Application Speech Recognition"—Proceeding of the IEEE, vol. 77, No. 2, Feb. 1989.

Steven B. Davis et al., "Comparison of Parametric Representations for Monosyllabic Word Recognition in Continuously Spoken Sentences"—IEEE Transactions on Acoustics, Speech, and Signal Processing, vol. ASSP 28, No. 4, p. 357-366, Aug. 1980.

G. David Forney, Jr., "The Viterbi Agorithm"—Proceeding of the IEEE, vol. 61, No. 3, p. 268-278, Mar. 1973.

Kai-Fu Lee et al., "Speaker-Independent phone Recognition Using Hidden Markov Models"—IEEE Transaction in Acoustics, Speech, and Signal Processing, vol. 37, No. 11, p. 1641-1648, Nov. 1989.

Hans Werner Strube, "Linear Prediction on a Warped Frequency Scale,"—The Journal of the Acoustical Society of America, vol. 68, No. 4, p. 1071-1076, Oct. 1980.

Leonard E. Baum et al., "A Maximization Technique Occurring in the Statistical Analysis of Probabilistic Functions of Markov Chains,"—The Annals of Mathematical Statistics, vol. 41, No. 1, p. 164-171, Feb. 1970.

Japanese Office Action for Japanese Patent Application No. 2006-306305 dated Apr. 20, 2010.

Japanese Office Action for Japanese Patent Application No. 2006-306305 dated Feb. 15, 2011.

* cited by examiner

METHOD AND SYSTEM FOR GAUSSIAN PROBABILITY DATA BIT REDUCTION AND COMPUTATION

FIELD OF THE INVENTION

This application relates to speech recognition and more particularly to computing Gaussian probability in speech recognition methods and systems.

BACKGROUND OF THE INVENTION

Speech recognition technologies allow computers and other electronic devices equipped with a source of sound input, such as a microphone, to interpret human speech, e.g., for transcription or as an alternative method of interacting with a computer. Speech recognition software is being developed for use in consumer electronic devices such as mobile telephones, game platforms, personal computers and personal digital assistants. In a typical speech recognition algorithm, a time domain signal representing human speech is broken into a number of time windows and each window is converted to a frequency domain signal, e.g., by fast Fourier transform (FFT). This frequency or spectral domain signal is then compressed by taking a logarithm of the spectral domain signal and then performing another FFT. From the compressed signal, a statistical model can be used to determine phonemes and context within the speech represented by the signal.

Speech recognition systems often use a Hidden Markov Model (HMM) to determine the units of speech in a given speech signal. The speech units may be words, two-word combinations or sub-word units, such as phonemes and the like. The HMM is characterized by:

L, which represents a number of possible states of the system;
M, which represents the total number of Gaussians that exist in the system;
N, which represents the number of distinct observable features at a given time; these features may be spectral (i.e., frequency domain) or temporal (time domain) features of the speech signal;
$A=\{a_{ij}\}$, a state transition probability distribution, where each $a_{ij}$ represents the probability that the system will transition to the $j^{th}$ state at time t+1 if the system is initially in the $i^{th}$ state at time t;
$B=\{b_j(k)\}$, an observation feature probability distribution for the $j^{th}$ state, where each $b_j(k)$ represents the probability distribution for observed values of the $k^{th}$ feature when the system is in the $j^{th}$ state; and
$\pi=\{\pi_i\}$, an initial state distribution, where each component $\pi_i$ represents the probability that the system will be in the $i^{th}$ state at some initial time.

Hidden Markov Models can solve three basic problems of interest in real world applications, such as speech recognition: (1) Given a sequence of observations of a system, how can one efficiently compute the probability of the observation sequence; (2) given the observation sequence, what corresponding state sequence best explains the observation sequence; and (3) how can one adjust the set of model parameters A, B π to maximize the probability of a given observation sequence.

The application of HMMs to speech recognition is described in detail, e.g., by Lawrence Rabiner in "A Tutorial on Hidden Markov Models and Selected Applications in Speech Recognition" in Proceedings of the IEEE, Vol. 77, No. 2, February 1989, which is incorporated herein by reference in its entirety for all purposes. Real-world processes generally produce observable outputs which can be characterized as signals. The signals can be discrete in nature (e.g., characters from a finite alphabet, quantized vectors from a codebook, etc.), or continuous in nature (e.g., speech samples, temperature measurements, music, etc.). The signal source can be stationary (i.e., its statistical properties do not vary with time), or nonstationary (i.e., the signal properties vary over time). The signals can be pure (i.e., coming strictly from a single source), or can be corrupted from other signal sources (e.g., noise) or by transmission distortions, reverberation, etc. Human speech can be characterized by a number of recognizable patterns known as phonemes. Each of these phonemes can be broken down in a number of parts, e.g., a beginning, middle and ending part. It is noted that the middle part is typically the most stable since the beginning part is often affected by the preceding phoneme and the ending part is affected by the following phoneme. The different parts of the phonemes are characterized by frequency domain features that can be recognized by appropriate statistical analysis of the signal. The statistical model often uses Gaussian probability distribution functions to predict the probability for each different state of the features that make up portions of the signal that correspond to different parts of different phonemes. One HMM state can contain one or more Gaussians. A particular Gaussian for a given possible state, e.g., the $k^{th}$ Gaussian can be represented by a set of N mean values $\mu_{ki}$ and variances $\sigma_{ki}$. In a typical speech recognition algorithm one determines which of the Gaussians for a given time window is the largest one. From the largest Gaussian one can infer the most probable phoneme for the time window.

In typical speech recognition software, each mean and variance for each Gaussian is represented by a 32-bit floating point number. Since there may be a large number of different possible Gaussians, the determination of the most probable state may involve calculations involving between several hundred and several thousand Gaussians. A significant number of floating point operations must be performed on each Gaussian during the speech recognition algorithm, and the correspondingly large number of 32-bit parameters leads to a considerable demand on the available memory of the computer or other signal processing device that performs the speech recognition. It would be desirable to perform the Gaussian computations in a way that reduces that demand on available memory without sacrificing recognition accuracy.

SUMMARY OF THE INVENTION

According to embodiments of the present invention, use of runtime memory may be reduced in a data processing algorithm that uses one or more probability distribution functions. Each probability distribution function may be characterized by one or more uncompressed mean values and one or more variance values. The uncompressed mean and variance values may be represented by α-bit floating point numbers, where a is an integer greater than 1. The probability distribution functions are converted to compressed probability functions having compressed mean and/or variance values represented as β-bit integers, where β is less than α, whereby the compressed mean and/or variance values occupy less memory space than the uncompressed mean and/or variance values. Portions of the data processing algorithm can be performed with the compressed mean and variance values.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
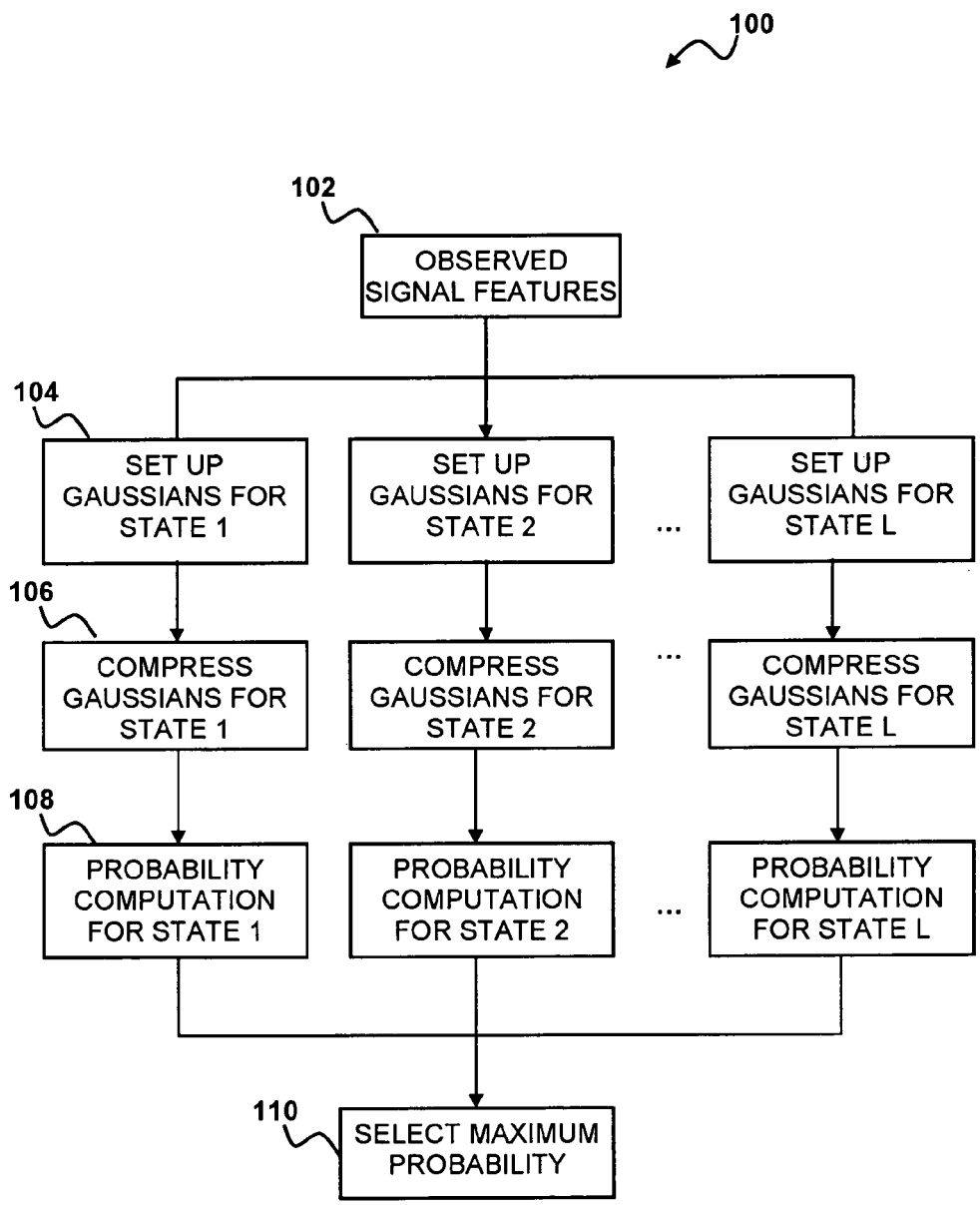
FIG. 1 is a flow diagram illustrating a recognition algorithm according to an embodiment of the present invention.

Application of embodiments of the present invention described herein to the particular case of recognition algorithms, such as speech recognition can be seen from the flow diagram of algorithm 100 of FIG. 1. Specifically, at 102, a time domain signal is analyzed to obtain N different observable signal features $x_0 \ldots x_n$, where n=N−1. The observed feature of the system can be represented as a vector having components $x_0 \ldots x_n$. These components may be spectral, cepstral, or temporal features of a given observed speech signal.

By way of example and without limitation of the embodiments of the invention, the components $x_0 \ldots x_n$ may be cepstral coefficients of the speech signal. A cepstrum (pronounced "kepstrum") is the result of taking the Fourier transform (FT) of the decibel spectrum as if it were a signal. The cepstrum of a time domain speech signal may be defined verbally as the Fourier transform of the log (with unwrapped phase) of the Fourier transform of the time domain signal. The cepstrum of a time domain signal S(t) may be represented mathematically as FT(log(FT(S(t)))+j2πq), where q is the integer required to properly unwrap the angle or imaginary part of the complex log function. Algorithmically: the cepstrum may be generated by the sequence of operations: signal→FT→log→phase unwrapping→FT cepstrum.

There is a complex cepstrum and a real cepstrum. The real cepstrum uses the logarithm function defined for real values, while the complex cepstrum uses the complex logarithm function defined for complex values also. The complex cepstrum holds information about magnitude and phase of the initial spectrum, allowing the reconstruction of the signal. The real cepstrum only uses the information of the magnitude of the spectrum. By way of example and without loss of generality, the algorithm 100 may use the real cepstrum.

The cepstrum can be seen as information about rate of change in the different spectrum bands. For speech recognition applications, the spectrum is usually first transformed using the Mel Frequency bands. The result is called the Mel Frequency Cepstral Coefficients or MFCCs. A frequency f in hertz (cycles per second) may be converted a dimensionless pitch m according to: m=1127.01048 $\log_e$(1+f/700). Similarly a mel pitch can be converted to a frequency in hertz using: f=700($e^{m/1127.01048}$−1).

Certain patterns of combinations of components $x_0 \ldots x_n$ correspond to units of speech (e.g., words) or sub-units, such as syllables, phonemes or other sub-units of words. Each unit or sub-unit may be regarded as a state of the system. The probability density function $f_k(x_0 \ldots x_n)$ for a given Gaussian of the system (the $k^{th}$ Gaussian) may be any type of probability density function, e.g., a Gaussian function having the following form:

$$f_k(x_0 \ldots x_n) = \frac{1}{\sqrt{\delta_k}} \exp\left(-\sum_i \frac{(x_i - \mu_{ki})^2}{2 \cdot \sigma_{ki}^2}\right) \quad (1)$$

where $\delta_k = \prod_i (2\pi \cdot \sigma_{ki}^2)$ $i = 1 \ldots N, k = 1 \ldots M.$ In the above equations, "i" is an index for feature and "k" is an index for Gaussian. In equation (1), the subscript k is an index for the Gaussian function. There may be several hundred to several hundred thousand Gaussians used by the speech recognition algorithm. The quantity $\mu_{ki}$ is a mean value for the feature $x_i$ in the $k^{th}$ Gaussian of the system. The quantity $\sigma_{ki}^2$ is the variance for $x_i$ in the $k^{th}$ Gaussian. As indicated at 104 in FIG. 1, there are L different states, which contain a total number of M Gaussians in the system. The quantity $\mu_{ki}$ is the mean for all measurements of $x_i$ that belong to $f_k(x_0 \ldots x_N)$ over all time windows of training data and $\sigma_{ki}$ is the variance for the corresponding measurements used to compute $\mu_{ki}$.

Usually, each quantity $(x_i, \mu_{ki}, \sigma_{ki})$ is represented by a floating data type characterized by a number of bits α. By way of example, α=32, although other values of α, such as 64-bit, 16, bit, or any other suitable integer number of bits may be used. The parameters $\{x_i, \mu_{ki}, \sigma_{ki}$ for i=1 … N, k=1 … M$\}$ occupy a major part of the memory used by acoustic models during program run time. The redundant parameter $\delta_k$ is stored for computation efficiency in realtime.

Referring again to FIG. 1, at 106, the Gaussians are converted to a compressed form to save the run time memory. Embodiments of the present invention a method compress the means $\mu_{ki}$, and variances $\sigma_{ki}^2$ from an α-bit floating point representation to a β-bit fix point data type $\{\hat{\mu}_{ki}, \hat{\zeta}_{ki}\}$, where β is less than α. The observable components $x_i$ are also compressed from α-bit floating point to β-bit integer $\hat{x}_i$. It is also possible to convert from α bits to a β-bit integer where β<α using the same equations shown below.

The Gaussians of equation (1) can be rewritten as compressed Gaussians in terms of a compressed mean $\hat{\mu}_{ki}$, compressed variance $\hat{\zeta}_{ki}$ as:

$$\hat{f}_k(x_0 \ldots x_n) = \frac{1}{\sqrt{\delta_k}} \exp\left(-\frac{1}{2} a \cdot \left(\sum_i (\hat{x}_i - \hat{\mu}_{ki})^2 \cdot \hat{\zeta}_{ki}\right)\right) \quad (2)$$

where $$\delta_k = \prod_i (2\pi \cdot \sigma_{ki}^2),$$

a determinant, is an α-bit floating point number as defined above $\hat{x}_i \phi((x_i - b_i) \cdot c_i)$ is a β-bit integer representing a compressed observable component $\hat{\mu}_{ki} = \phi((\mu_{ki} b_i) \cdot c_i)$ is a β-bit integer representing a compressed mean for the $i^{th}$ observable component in the $k^{th}$ Gaussian.

$$\hat{\zeta}_{ki} = \phi\left(\frac{1}{2\sigma_{ki}^2 d_i}\right)$$

of β-bit integer integer representing a compressed variance for the $i^{th}$ observable component in the $k^{th}$ Gaussian.

$$\phi(x) = \begin{cases} \Theta\_if\_x > \Theta \\ -\Theta\_if\_x < -\Theta \end{cases}$$

and φ(x)=the fixed point representation of x otherwise, where $$\Theta = 2^{62} - 1$$

Extra parameters $\{a, b_i, c_i\}$ may be of α-bit floating point data type. However, these parameters are the same for all M Compressed Gaussian probability functions. Furthermore, the quantity a only needs to be calculated once.

In the above equations, the quantity a may be regarded as a universal scalar. The quantity $b_i$ may be regarded as a centroid of all the means for the $i^{th}$ observable feature taken over all M possible Gaussians. The quantity $c_i$ may be regarded as a variance for the $i^{th}$ observable feature taken over all M possible Gaussians. The computations of $\{a, b_i, c_i\}$ from the original $(\mu_i, \sigma_i)$ are shown in the following equations:

$$a = \frac{2}{\lambda^3},$$

$$b_i = \frac{\sum_{k=1}^{M} \mu_{ki}}{M},$$

$$c_i = \lambda \cdot \sqrt{\frac{\sum_{k=1}^{M} \frac{1}{\sigma_{ki}^2}}{M}}, \text{ and}$$

$$d_i = \frac{\sum_{k=1}^{M} \frac{1}{\sigma_{ki}^2}}{M \cdot \lambda}$$

The quantity $d_i$ is the average of the inverse of all the variances. The quantity λ is an integer global scaling factor that may take on a value between 1 and 100. The quantity λ may be adjusted empirically by trial and error to optimize recognition accuracy. This can be done by testing the speech recognition system against a known speech sample and determining the recognition accuracy for different values of λ. In one example implementation of a speech recognition algorithm using parameter compression as described herein, λ=30 was empirically determined to provide the best speech recognition performance for the feature $\{x_i\}$ used by the program in a case where α=32 and β=8. Such empirical determination of λ may be done, e.g., by testing the speech recognition with compressed data against a known speech sample for different values of λ and determining which value of λ produces the highest recognition accuracy. The value of λ generally depends on the features chosen to model the speech recognition and on the values of α and β.

A more objective optimization of λ may be performed using the following equation:

$$\lambda = \arg\min_{\lambda} \left( \sum_k \sum_i \int (f_k(x_i) - \hat{f}_k(x_i))^2 \cdot \delta x_i \right)$$

where arg min refers to the value of λ that produces a minimum value of the quantity $$\left( \sum_k \sum_i \int (f_k(x_i) - \hat{f}_k(x_i))^2 \cdot \delta x_i \right)$$

where $\int \delta x_i$ denotes the integration over variable $x_i$.

Since N is usually a lot smaller than M, say N=39, M=1000, run time memory of the new Gaussian parameters $\{\hat{x}_i, \delta_{ki}, \hat{\zeta}_{ki}, a, b_i, c_i\}$ may be reduced significantly compared to the original parameters $\{x_i, \delta_{ki}, \mu_{ki}, \sigma_{ki}\}$. For example, when α=32 and β=8 the memory size for the compressed Gaussian data can be reduced to about 25% of that occupied by the uncompressed Gaussian data. Note that although in the preceding discussion the means $\mu_{ki}$, variances $\sigma_{ki}$ and signal feature components $x_i$ were all converted to compressed values, some useful level of memory size reduction can be obtained by compressing only one or two of these.

Once the Gaussian data have been compressed, the probability for each Gaussian can be computed using the compressed Gaussian functions of equation (2) as indicated at 108 in FIG. 1. After all the probabilities have been computed a maximum probability is determined as indicated at 110. From the Gaussian having the maximum probability one can build the most likely, state, word, phoneme, character, etc. for that particular time window. Note that it is also possible to use the most probable state for a given time window to help in determining the most probable state for earlier or later time windows since, these may determine a context in which the state occurs.

EXAMPLE

In one implementation of data compression as described above in a speech recognition task for American English, N=20, M=968 with α=32 and β=8 total data bit size for parameters $\{x_k, \delta_{ki}, \mu_{ki}, \sigma_{ki}\}$ is N*32+M*32+2*M*N*32. After compression, parameters, $\hat{x}_k, \hat{\mu}_{ki}$, and $\hat{\zeta}_{ki}$ were computed as β-bit integers. The total data bit size for $\{\hat{x}_k, \delta_k, \hat{\mu}_{ki}, \hat{\zeta}_{ki}, a, b_i, c_i\}$ after compression is N*β+M*32+2*M*N*β+32+2*N*32. The results are listed in Table I. In this example, there are 129 words in the grammar from which 745 different sentences can be constructed.

TABLE I

Gaussian parameter bit size and speech recognition results

| | Total data size in bits | Recognition accuracy | Memory reduction |
|---|---|---|---|
| α = 32 bit float | 1270656 | 96.2% | — |
| β = 8 bit integer | 342208 | 96.8% | 73.07% |

It is noted that, in this example, the total data size after compression is about a quarter of the uncompressed data size. Most of the reduction in data size is the result of the compression of the mean and variance values from 32-bit floating to 8-bit integer. Note further that, in this example, there was no loss in recognition accuracy as a result of the compression.

Figure 2:
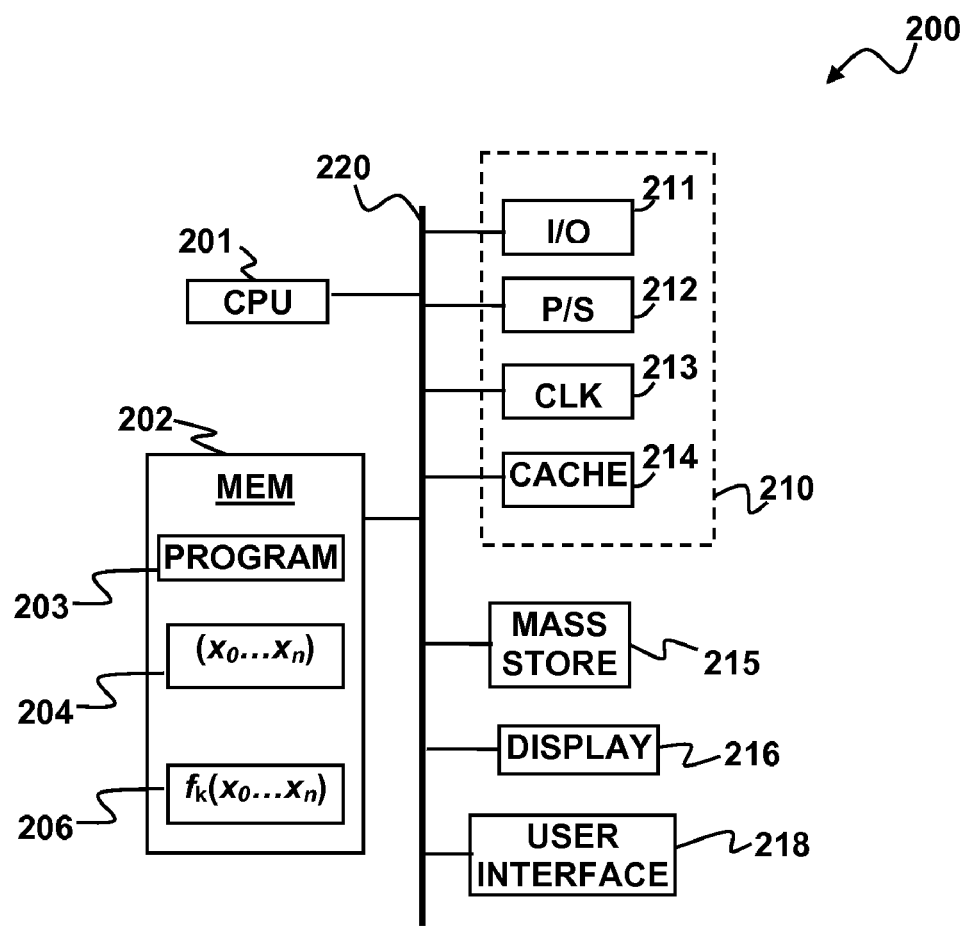
FIG. 2 is a flow diagram illustrating a schematic diagram of a signal processing apparatus operating with recognition algorithm of the type depicted in FIG. 1 according to an embodiment of the present invention.

According to embodiments of the present invention, a recognition algorithm (e.g., a speech recognition algorithm) of the type depicted in FIG. 1 operating as described above may be implemented as part of a signal processing apparatus 200, as depicted in FIG. 2. The system 200 may include a processor 201 and a memory 202 (e.g., RAM, DRAM, ROM, and the like). In addition, the signal processing apparatus 200 may have multiple processors 201 if parallel processing is to be implemented. The memory 202 includes data and code configured as described above. Specifically, the memory includes data representing signal features 204, and probability functions 206 each of which may include code, data or some combination of both code and data.

The apparatus 200 may also include well-known support functions 210, such as input/output (I/O) elements 211, power supplies (P/S) 212, a clock (CLK) 213 and cache 214. The apparatus 200 may optionally include a mass storage device 215 such as a disk drive, CD-ROM drive, tape drive, or the like to store programs and/or data. The controller may also optionally include a display unit 216 and user interface unit 218 to facilitate interaction between the controller 200 and a user. The display unit 216 may be in the form of a cathode ray tube (CRT) or flat panel screen that displays text, numerals, graphical symbols or images. The user interface 218 may include a keyboard, mouse, joystick, light pen or other device. In addition, the user interface 218 may include a microphone, video camera or other signal transducing device to provide for direct capture of a signal to be analyzed. The processor 201, memory 202 and other components of the system 200 may exchange signals (e.g., code instructions and data) with each other via a system bus 220 as shown in FIG. 2.

As used herein, the term I/O generally refers to any program, operation or device that transfers data to or from the system 200 and to or from a peripheral device. Every transfer is an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, camera, external Zip drive or scanner as well as internal devices, such as a CD-ROM drive, CD-R drive or internal modem or other peripheral such as a flash memory reader/writer, hard drive.

The processor 201 may perform signal recognition including data compression of signal features 204 and/or probability functions 206 as described above in response to data and program code instructions of a program 203 stored and retrieved by the memory 202 and executed by the processor module 201. Code portions of the program 203 may conform to any one of a number of different programming languages such as Assembly, C++, JAVA or a number of other languages. The processor module 201 forms a general-purpose computer that becomes a specific purpose computer when executing programs such as the program code 203. Although the program code 203 is described herein as being implemented in software and executed upon a general purpose computer, those skilled in the art will realize that the method of task management could alternatively be implemented using hardware such as an application specific integrated circuit (ASIC) or other hardware circuitry. As such, it should be understood that embodiments of the invention can be implemented, in whole or in part, in software, hardware or some combination of both. In one embodiment, among others, the program code 203 may include a set of processor readable instructions that implement a method having features in common with the algorithm 100 of FIG. 1.

Embodiments of the present invention provide for faster operation of complex recognition algorithms such as speech recognition. Those of skill in the art will recognize that embodiments of the present invention may be readily applied to other types of recognition algorithms, including optical character recognition. In addition, the technique may be extended to HMMs that use probability functions other than Gaussian functions. Furthermore although compression from 32-bit floating point to 8-bit integer has been described, the technique described herein is generally applicable to any other suitable compression, e.g., 64-bit to 16-bit and the like provide $\beta$ is less than $\alpha$. Compression to fewer than 8 bits is within the scope of embodiments of the present invention. However, in general, for a given value of a there will be some practical lower limit for $\beta$ beyond which the data compression may produce an unacceptable reduction in recognition accuracy.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A speech recognition apparatus, comprising:
    a signal processor configured to observe N different features of an observed speech signal and set up M different probability distribution functions of the N different observable features, each probability distribution function representing a probability of a different one of M possible Gaussians of a portion of the observed speech signal, wherein each Gaussian is characterized by a corresponding uncompressed mean a corresponding uncompressed variance
    wherein the signal processor is configured to process the observed signal to determine the observable features for a time window and represent the one or more different states of the features with the M Gaussian probability distribution functions, wherein the uncompressed mean and variance values are represented by $\alpha$-bit floating point numbers, where $\alpha$ is an integer greater than 1;
    wherein the signal processor is configured to convert the probability distribution functions to compressed probability functions having compressed mean and/or variance values represented as $\beta$-bit integers, where $\beta$ is less than $\alpha$, whereby the compressed mean and/or variance values occupy less memory than the uncompressed mean and/or variance values,
    wherein the signal processor is configured to calculate a probability for each of the M possible Gaussians using the compressed probability functions wherein each compressed mean value is equal to a function of a quantity, wherein the quantity is product of a difference between the uncompressed variance and a centroid of the means for a given observable feature for all possible Gaussians with a variance for the given observable feature for all possible Gaussians, wherein the function is equal to $2^{\beta}-1$, if the quantity is greater than $2^{\beta}-1$, wherein the function is equal to $-(2^{\beta}-1)$ if the quantity is less than $-(2^{\beta}-1)$, and wherein the function is equal to a fixed point representation of the quantity otherwise,
    wherein the signal processor is configured to determine a most probable state from the calculated probabilities for the M possible Gaussians, and
    wherein the signal processor is configured to recognize a recognizable pattern within the observed speech signal for the time window using the most probable state.

2. The apparatus of claim 1 wherein the centroid of the means for a given observable feature for all possible Gaussians is equal to a sum of the uncompressed means for the M Gaussians divided by M.

3. The apparatus of claim 1 wherein the variance for a given observable feature for all possible Gaussians is equal to an integer global scaling factor multiplied by a square root, wherein the square root is a square root of a quotient, wherein the quotient is a sum divided by M, wherein the sum is a sum of inverses of the uncompressed variances for the M Gaussians for the given observable feature.

4. The apparatus of claim 1 wherein converting the probability distribution functions to compressed probability functions includes compressing values for the one or more observable features from $\alpha$-bit floating point type to compressed observable feature values of $\beta$-bit integer type.

5. The apparatus of claim 4 wherein each compressed observable feature value is equal to a function of a quantity, wherein the quantity is a product of a difference between a given observable feature value and the centroid of the means for a given observable feature for all possible Gaussians with the variance for the given observable feature for all possible Gaussians, wherein the function is equal to $2^{\beta}-1$, if the quantity is greater than $2^{\beta}-1$, wherein the function is equal to $-(2^{\beta}-1)$ if the quantity is less than $-(2^{\beta}-1)$, and wherein the function is equal to a fixed point representation of the quantity otherwise.

6. The apparatus of claim 5 wherein the centroid of the means for a given observable feature for all possible Gaussians is equal to a sum of the uncompressed means for the M Gaussians divided by M.

7. The apparatus of claim 5 wherein the variance for a given observable feature for all possible Gaussians is equal to an integer global scaling factor chosen to optimize recognition accuracy multiplied by a square root, wherein the square root is a square root of a quotient, wherein the quotient is a sum divided by M, wherein the sum is a sum of inverses of the uncompressed variances for the M Gaussians for the given observable feature.

8. The apparatus of claim 1 wherein each compressed variance for a given Gaussian of a given observable feature is equal to a function of an inverse of a first product, wherein the first product is a product of 2 with a corresponding uncompressed variance and a factor, wherein the factor is equal to a sum divided by a second product, wherein the sum is a sum of inverses of the uncompressed variances for the M Gaussians for the given observable feature where the second product is a product of M and a global scaling factor chosen to optimize recognition accuracy, wherein the function is equal to $2^{\beta}-1$, if the quantity is greater than $2^{\beta}-1$, wherein the function is equal to $-(2^{\beta}-1)$ if the quantity is less than $-(2^{\beta}-1)$, and wherein the function is equal to a fixed point representation of the quantity otherwise.

9. The apparatus of claim 8 wherein the global scaling factor chosen to optimize recognition accuracy is equal to about 30.

10. The apparatus of claim 8 wherein the global scaling factor chosen to optimize recognition accuracy is the argmin of the sum over all M Gaussians of the sum over all features of the integral with respect to each given feature of the difference between the Gaussian probability distribution functions and the compressed probability distribution functions.

11. The apparatus of claim 1 wherein each compressed probability distribution function includes an exponential of a product of a universal scalar and a sum, wherein the sum is a sum over all features of a product of a square of a difference multiplied by a compressed variance value for an observable feature, wherein the difference is a difference between a compressed value of an observable feature and a corresponding compressed mean value for the observable feature, wherein the universal scaling factor is equal to −2 divided by the cube of a global scaling factor chosen to optimize recognition accuracy, wherein the compressed variance value is equal to a function of an inverse of a first product, wherein the first product is a product of 2 with a corresponding uncompressed variance and a factor, wherein the factor is equal to a sum divided by a second product, wherein the sum is a sum of inverses of the uncompressed variances for the M Gaussians for the given observable feature where the second product is a product of M and the global scaling factor chosen to optimize recognition accuracy, wherein the function is equal to $2^{\beta}-1$, if the quantity is greater than $2^{\beta}-1$, wherein the function is equal to $-(2^{\beta}-1)$ if the quantity is less than $-(2^{\beta}-1)$, and wherein the function is equal to a fixed point representation of the inverse of the first product otherwise.

12. The apparatus of claim 11, further comprising, a value of the global scaling factor has been empirically determined to optimize recognition accuracy.

13. The method of claim 1 wherein the recognizable pattern is a most likely, phoneme or word for the time window.

14. An apparatus for reducing use of runtime memory in a data processing algorithm that uses one or more Gaussian probability distribution functions for one or more different states of features $x_t$ that make up portions of an observed speech signal, wherein the Gaussian probability distribution functions include M Gaussian functions of N different observable features, each Gaussian function representing the probability distribution for a different one of M possible Gaussians, each Gaussian function being characterized by an uncompressed mean and an uncompressed variance, the apparatus comprising:

means for processing the observed speech signal to determine the observable features for a time window;

means for representing the one or more different states of the features with the M Gaussian probability distribution functions, wherein the uncompressed mean and variance values are represented by $\alpha$-bit floating point numbers, where $\alpha$ is an integer greater than 1;

means for converting the probability distribution functions to compressed probability functions having compressed mean and/or variance values represented as $\beta$-bit integers, where $\beta$ is less than $\alpha$, whereby the compressed mean and/or variance values occupy less memory than the uncompressed mean and/or variance values, wherein each compressed mean value is equal to a function of a quantity, wherein the quantity is product of a difference between the uncompressed variance and a centroid of the means for a given observable feature for all possible Gaussians with a variance for the given observable feature for all possible Gaussians, wherein the function is equal to $2^{\beta}-1$, if the quantity is greater than $2^{\beta}-1$, wherein the function is equal to $-(2^{\beta}-1)$ if the quantity is less than $-(2^{\beta}-1)$, and wherein the function is equal to a fixed point representation of the quantity otherwise; and means for determining a most likely state of the features from the M Gaussian functions with the compressed mean and variance values; and means for recognizing a recognizable pattern within the observed speech signal for the time window using the most likely state.

15. A speech signal recognition method, comprising:

observing N different features of an observed speech signal representing a real-world process;

setting up M different probability distribution functions of the N different observable features with a signal processor, wherein each probability distribution function represents a probability of a different one of M possible Gaussians of a portion of the observed speech signal, wherein each Gaussian is characterized by a corresponding uncompressed mean a corresponding uncompressed variance, processing the observed speech signal with the signal processor to determine the observable features for a time window and represent the one or more different states of the features with the M Gaussian probability distribution functions, wherein the uncompressed mean and variance values are represented by $\alpha$-bit floating point numbers, where $\alpha$ is an integer greater than 1;

converting the probability distribution functions with the signal processor to compressed probability functions having compressed mean and/or variance values represented as $\beta$-bit integers, where $\beta$ is less than $\alpha$, whereby the compressed mean and/or variance values occupy less memory than the uncompressed mean and/or variance values, calculating a probability for each of the M possible Gaussians with the signal processor using the compressed probability functions wherein each compressed mean value is equal to a function of a quantity, wherein the quantity is product of a difference between the uncompressed variance and a centroid of the means for a given observable feature for all possible Gaussians with a variance for the given observable feature for all possible Gaussians, wherein the function is equal to $2^\beta-1$, if the quantity is greater than $2^\beta-1$, wherein the function is equal to $-(2^\beta-1)$ if the quantity is less than $-(2^\beta-1)$, and wherein the function is equal to a fixed point representation of the quantity otherwise, determining a most probable state with the processor from the calculated probabilities for the M possible Gaussians; and recognizing a recognizable pattern within the observed speech signal with the signal processor for the time window using the most probable state.

16. The method of claim 15 wherein converting the probability distribution functions to compressed probability functions includes compressing values for one or more observable features from $\alpha$-bit floating point type to $\beta$-bit integer type.

17. The method of claim 15 wherein $\alpha$ is 32 and $\beta$ is 8.

18. The method of claim 15 wherein the centroid of the means for a given observable feature for all possible Gaussians is equal to a sum of the uncompressed means for the M Gaussians divided by M.

19. The method of claim 15 wherein the variance for a given observable feature for all possible Gaussians is equal to an integer global scaling factor chosen to optimize recognition accuracy multiplied by a square root, wherein the square root is a square root of a quotient, wherein the quotient is a sum divided by M, wherein the sum is a sum of inverses of the uncompressed variances for the M Gaussians.

20. The method of claim 15 wherein converting the probability distribution functions to compressed probability functions includes compressing values for the one or more observable features from $\alpha$-bit floating point type to compressed observable feature values of $\beta$-bit integer type.

21. The method of claim 20 wherein each compressed observable feature value is equal to a function of a quantity, wherein the quantity is a product of a difference between a given observable feature value and the centroid of the means for a given observable feature for all possible Gaussians with the variance for the given observable feature for all possible Gaussians, wherein the function is equal to $2^\beta-1$, if the quantity is greater than $2^\beta-1$, wherein the function is equal to $-(2^\beta-1)$ if the quantity is less than $-(2^\beta-1)$, and wherein the function is equal to a fixed point representation of the quantity otherwise.

22. The method of claim 21 wherein the centroid of the means for a given observable feature for all possible Gaussians is equal to a sum of the uncompressed means for the M Gaussians divided by M.

23. The method of claim 21 wherein the variance for a given observable feature for all possible Gaussians is equal to an integer global scaling factor chosen to optimize recognition accuracy multiplied by a square root, wherein the square root is a square root of a quotient, wherein the quotient is a sum divided by M, wherein the sum is a sum of inverses of the uncompressed variances for the M Gaussians for the given observable feature.

24. The method of claim 15 wherein each compressed variance for a given Gaussian of a given observable feature is equal to a function of an inverse of a first product, wherein the first product is a product of 2 with a corresponding uncompressed variance and a factor, wherein the factor is equal to a sum divided by a second product, wherein the sum is a sum of inverses of the uncompressed variances for the M Gaussians for the given observable feature where the second product is a product of M and a global scaling factor chosen to optimize recognition accuracy, wherein the function is equal to $2^\beta-1$, if the quantity is greater than $2^\beta-1$, wherein the function is equal to $-(2^\beta-1)$ if the quantity is less than $-(2^\beta-1)$, and wherein the function is equal to a fixed point representation of the quantity otherwise.

25. The method of claim 24 wherein the global scaling factor chosen to optimize recognition accuracy is equal to about 30.

26. The method of claim 24 wherein the global scaling factor chosen to optimize recognition accuracy is the argmin of the sum over all M Gaussians of the sum over all features of the integral with respect to each given feature of the difference between the Gaussian probability distribution functions and the compressed probability distribution functions.

27. The method of claim 21 wherein each compressed probability distribution function includes an exponential of a product of a universal scalar and a sum, wherein the sum is a sum over all features of a product of a square of a difference multiplied by a compressed variance value for an observable feature, wherein the difference is a difference between a compressed value of an observable feature and a corresponding compressed mean value for the observable feature, wherein the universal scaling factor is equal to $-2$ divided by the cube of a global scaling factor chosen to optimize recognition accuracy, wherein the compressed variance value is equal to a function of an inverse of a first product, wherein the first product is a product of 2 with a corresponding uncompressed variance and a factor, wherein the factor is equal to a sum divided by a second product, wherein the sum is a sum of inverses of the uncompressed variances for the M Gaussians for the given observable feature where the second product is a product of M and the global scaling factor chosen to optimize recognition accuracy, wherein the function is equal to $2^\beta-1$, if the quantity is greater than $2^\beta-1$, wherein the function is equal to $-(2^\beta-1)$ if the quantity is less than $-(2^\beta-1)$, and wherein the function is equal to a fixed point representation of the inverse of the first product.

28. The method of claim 27, further comprising, empirically determining a value of the global scaling factor that optimizes recognition accuracy.

29. The method of claim 27 wherein the global scaling factor is an integer between 1 and 100.

30. The method of claim 27 wherein $\alpha=32$, $\beta=8$ and the global scaling factor is equal to 30.

31. The method of claim 15 wherein determining the most probable state includes selecting a maximum probability from among the probabilities for the M possible Gaussians.

32. The method of claim 15 wherein observing the N different features includes converting a time domain signal to a cepstrum characterized by a plurality of cepstral coefficients wherein the N features include selected cepstral coefficients.

33. The method of claim 15 wherein the recognition method is a speech recognition method or optical character recognition method.

34. The method of claim 15 wherein the recognition method uses a hidden Markov model.

* * * * *